Feb. 10, 1970     F. M. LAWTER     3,494,066

LIVE BAIT RETAINER FOR FISHHOOKS

Filed May 5, 1967

INVENTOR.
FRED M. LAWTER,
BY Berman, Davidson & Berman
ATTORNEYS.

United States Patent Office 3,494,066
Patented Feb. 10, 1970

3,494,066
LIVE BAIT RETAINER FOR FISHHOOKS
Fred M. Lawter, 1 Lawterdale Circle,
Asheville, N.C. 28804
Filed May 5, 1967, Ser. No. 636,323
Int. Cl. A01k *83/00, 91/04*
U.S. Cl. 43—44.8      5 Claims

ABSTRACT OF THE DISCLOSURE

A bait retainer comprising a needle-like member slidably and rotatably secured to the bight of a fishhook between the barb and the planar eye thereof, and a planar loop formed with the fishhook and positioned below the eye of the fishhook to engage and hold the free end of said member. The plane of the eye is substantially in the plane defined by the bight and fishhook shank, and the plane of the loop is perpendicular to that of the eye. The loop is laterally spaced from both the shank and the eye.

---

This invention relates to fishhooks of the type having special means to retain live bait without the necessity of passing the hook itself through the bait.

An object of this invention is to provide a combination hook and bait retainer in which the bait retainer does not interfere at all either with the barb point hook or with the eye of the hook to which the line is attached.

The above and other objects will be made clear from the following detailed description taken in connection with the annexed drawing, in which.

Nothing is more discouraging to a fisherman than to receive a magnificent strike and thereafter reel in a straight and futile hook. For this reason, when fishing waters known to contain such hard mouth fish as the red snapper or in fishing waters where the size of the fish to be encountered may range from one to fifty pounds, it is customary to use hooks which even though of relatively modest overall dimensions nevertheless have shanks and bights of fairly heavy gauge, stiff material. This means, of course, that the barb is relatively large and if such a hook is passed directly through the more delicate shrimp, the shrimp will have a very short active life on the hook. At the same time, under such fishing conditions, the line or the leader, or both, may be expected to be relatively heavy which requires for convenience in tying a fairly open eye on the hook.

The prior art contains numerous examples of bait retainers in which a relatively thin metal wire is used to pierce the minnow, thus making it unnecessary to pierce the minnow with the relatively heavy hook. However, in the examples of the prior art with which the applicant is familiar, such arrangements have either resulted in clogging the eye, making the hook difficult to rig, or in clogging the hook point itself, thereby interfering with the efficacy of the strike. The present invention is intended to overcome both of these difficulties.

Figure 1:
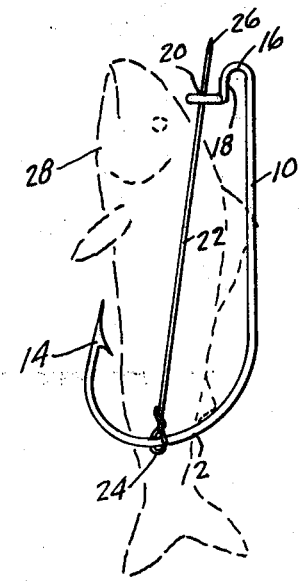
FIGURE 1 is a side elevation of a hook and retainer showing a minnow in position on the retainer.

Referring now to FIGURE 1, there is shown a hook carrying a shank 10, a bight or loop 12, a barb 14, and an open eye 16, to which a line or leader may be attached. The eye 16 has an inner vertical portion 18 which terminates in a horizontal open loop 20. The bait retainer 22 has at one end a loop 24 surrounding the bight 12 of the hook. The free end 26 of the retainer 22 is pointed and after passing through the body of the minnow 28, passes the open portion of the loop 20 and is secured thereby. It is true of FIGURES 1–3 under discussion and also of all the other forms, that the pin 22, if, without bait attached, enters the opening in loop 20, it could fall out by careful manipulation of the assembly. The phrase "careful manipulation" is used advisely. There is only about a 10% (or less) chance of this occurring. When a shrimp, minnow or other bait is impaled on the retainer 22, it is clamped between the retainer 22 and the shank 10. It thereby exerts a force tending to keep the retainer 22 away from the opening in the loop 20, which is thereby "secured." The loop 24 is freely slidable and rotatable on the bight 12.

When the retainer 22 is free of the loop 20, a line or leader may be attached to the eye of the hook 16 with the greatest of ease and with equal ease may be disconnected when it is desired to dismantle the tackle. As FIGURE 1 makes abundantly clear, the retainer 22, while perfectly performing its function of retaining the minnow without multilating it, does not interfere, in the slightest, either with the eye 16 or barb 14.

Figures 2, 4:
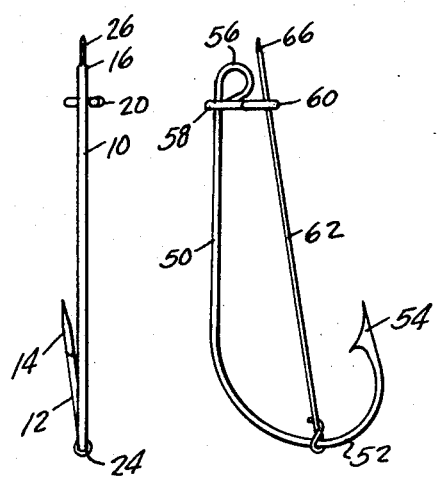
FIGURE 2 is a similar elevation from the right-hand side of FIGURE 1.
FIGURE 4 is a side elevation of a modified construction.
Figure 3:
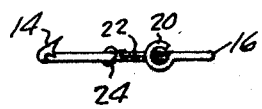
FIGURE 3 is a top plan view of FIGURE 1.
Figure 5:
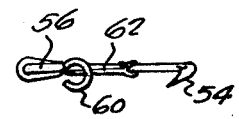
FIGURE 5 is a top plan view of FIGURE 4.

Referring now to FIGURES 4 and 5, there is shown a hook having a shank 50, a bight 52, and a barb 54. At its opposite end the shank 50 is formed into a loop 56, a portion 58 of which wraps around the shank 50 below the apex of the loop 56 and extends horizontally inward to form an open loop 60. The bait retainer 62 has at one end a loop 64 (see FIG. 6) which surrounds the bight 52. This is a detachable connection of conventional type. The loop 64 is disengaged from the retainer 62 by pressing on the free end of the loop 64 whereupon it swings clear of the body of the retainer, thus permitting entry into the loop 64 of the bight 52. The free end 66 of the retainer 62 enters the open loop 60, and is retained thereby. This leaves the eye 56 of the shank 50 completely unencumbered but a line or leader attached to the eye 56 does not depend at all on the retainer 62 for its own retention in the eye 56.

Figure 6:
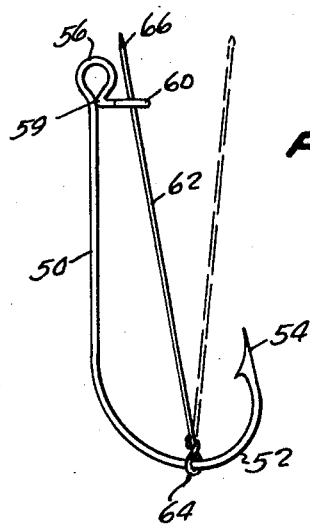
FIGURE 6 is a side elevation of a modification of FIGURE 4.

FIGURE 6 is simply a modification of FIGURES 4 and 5, and differs from FIGURE 4 only in that a loop or eye 56 is bent back into a simple contact at a bend 59 with the shank 50 and thereupon proceeds to the formation of an open loop 60 precisely as in FIGURE 4. The phrase "simple contact" means exactly that. The material is bendable and the loop 56 is bent so as normally to be in contact with the shank 50. For certain arrangements of line and leader, this construction offers a degree of convenience in fish line engagement.

While various specific details of construction have been disclosed, it is not intended, therefore, to limit this invention to the precise details disclosed.

What is claimed is:

1. In combination with a fishhook formed from a single length of material, and having a bight, a shank, a barb and a planar fish line engaging eye at the end of the shank, said plane of said eye being substantially in the plane defined by the bight and shank; a slightly open planar loop formed of said single length of material and positioned below the eye and oriented in a plane normal to the shank and also to the plane of the fish line engaging eye, said loop being laterally spaced from said shank and said eye; a bait retainer pin slidably and rotatably mounted on the bight and having its free end receivable in said loop, while said free end is spaced from said eye.

2. A combination as set forth in claim 1, in which a portion of said loop passes around the shank.

3. A combination as set forth in claim 1, in which said eye itself is open.

4. A combination as set forth in claim 1, in which said eye is closed by simple contact between the base of the loop and the shank.

5. For use in the combination set forth in claim 1, said bait retainer comprising a thin, rigid pin having one end pointed to penetrate the bait and having a loop at the opposite end to surround the bight of a fishhook, said last mentioned loop being formed with its free end wrapped partially around the pin for ready opening and closure to receive, hold and release said bight of the hook.

References Cited

UNITED STATES PATENTS

| | | | |
|---|---|---|---|
| 1,261,601 | 4/1918 | Ore | 43—44.8 |
| 2,797,522 | 7/1957 | Friedrich | 43—44.8 |
| 2,888,772 | 6/1959 | Lawter | 43—44.8 X |
| 2,276,194 | 3/1942 | Hochreiner | 24—161 |
| 2,597,679 | 5/1952 | Schwarzer | 43—44.8 |

FOREIGN PATENTS

| | | |
|---|---|---|
| 447,631 | 4/1948 | Canada. |
| 23,217 | 1893 | Great Britain. |
| 23,457 | 1894 | Great Britain. |

SAMUEL KOREN, Primary Examiner

JAMES H. CZERWONKY, Assistant Examiner

U.S. Cl. X.R.

43—44.83